F. RIESENBERG.
FOUNTAIN PEN.
APPLICATION FILED JAN. 24, 1910.

955,205.

Patented Apr. 19, 1910.

WITNESSES
Octavius Knight.
H. Alfred James.

INVENTOR
Felix Riesenberg
BY Knight Bros.
his ATTORNEYS

UNITED STATES PATENT OFFICE.

FELIX RIESENBERG, OF NEW YORK, N. Y.

FOUNTAIN-PEN.

955,205.    Specification of Letters Patent.    Patented Apr. 19, 1910.

Application filed January 24, 1910. Serial No. 539,794.

*To all whom it may concern:*

Be it known that I, FELIX RIESENBERG, a citizen of the United States, residing in the borough of Manhattan, city, county, and State of New York, have invented certain new and useful Improvements in Fountain-Pens, of which the following is a full and clear specification, illustrated by the accompanying drawings, the novelty of the invention being more fully pointed out in the annexed claims.

My invention relates to fountain pens and in particular to means whereby the amount of ink contained in the font of the pen can be ascertained from the outside at any time, the particular means employed affording various advantages which will be referred to hereinafter.

Figure 1:
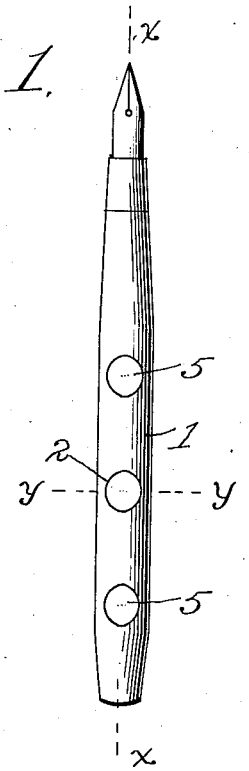
Figure 2:
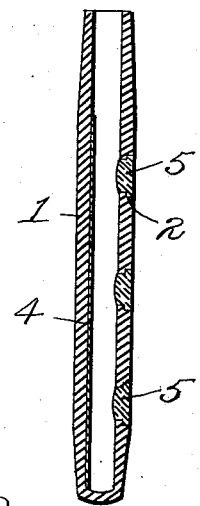
Figure 3:
Figure 4:
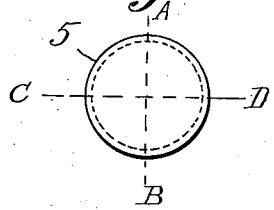
Figure 5:
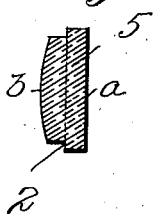
Figure 6:
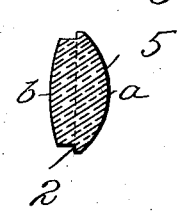

In the accompanying drawings illustrating my invention, Figure 1 represents a full view of a fountain pen embodying my improvement. Fig. 2 represents a longitudinal section through the font on the line $x$—$x$ in Fig. 1. Fig. 3 represents a transverse section on the line $y$—$y$ in Fig. 1. Fig. 4 is a plan view in larger scale of one of the lenses 5 illustrated in Figs. 1 and 2. Fig. 5 represents a transverse section through the lens shown in Fig. 4 on the line A—B. Fig. 6 is a transverse section through the lens shown in Fig. 4 on the line C—D.

For the purpose of ascertaining the amount of fluid contained in the font of the pen, I employ a plurality of lenses 5, Figs. 1 and 2, which are arranged on the font in a row at suitable intervals as shown in Fig. 1. While these lenses may consist of any suitable material, I prefer a clear annealed glass with which I have obtained the best results. These lenses are preferably round and are preferably provided with a shoulder 2 near the outer face of the lens, as shown in Figs. 2 and 3, with which they rest in a suitably shaped opening in the wall of the font as shown in Fig. 2. The lenses may be cemented onto their seats by any kind of cement or similar material, however preferably by means of rubber cement which I find will keep the seats tight in spite of the slight expansion of the font by the heat when carried in the pocket. The shape of the lenses is preferably so that their outer face will conform with the outer surface of the font so that no crevices or grooves are produced at the joint between the glass and the font, in which dirt can collect. For this reason, I have formed these lenses at their outer face cylindrical, so that these outer faces form in the direction $a$—$b$, Fig. 4, (which is longitudinal to the parallel axis of the font) a plane as shown at $a$, Fig. 5, while in the direction $c$—$d$ transverse thereto, these lenses are convex and conform with the cylinder formed by the font as shown at $a$ in Fig. 6. The inner face of each lens is preferably convex as shown at $b$ Figs. 5 and 6 and also in Figs. 2 and 3, by which I obtain the best results. This particular combination of lens I shall refer to hereinafter in the claims as a convex plano-convex lens. It is obvious, however, that any other lens combination which is adapted to properly enlarge the image of the opposite wall 4 of the font is suitable for this purpose. The inside of the font opposite from where the lenses are disposed is colored light by any suitable means, for instance by enamel or also by any other suitable light reflecting material is indicated at 4 so that the observer can easily ascertain through any of the lenses whether the portion of the font where the particular lens is located contains ink or not.

By employing lenses instead of plane glass as has been suggested in similar devices, I gain the advantage of more clearly showing to the observer whether the font contains ink or not, owing to the magnifying qualities of the lenses, which are obviously of such construction that they are focused to the light reflecting surface.

What I claim is:

1. In a fountain pen, an ink font of opaque material, having a portion of its interior wall of color distinct from that of the ink, and perforated in the side opposite said portion and provided in said perforation with a lens adapted to focus light on the wall of the font opposite said lens.

2. In a fountain pen, an ink font of opaque material, having a portion of its interior wall of color distinct from that of the ink, and perforated in the side opposite said portion and provided in said perforation with a convexo-plano-convex lens adapted to focus light on the wall of the font opposite said lens.

3. In a fountain pen, an ink font of opaque material having its wall perforated in series longitudinal of the font, lenses in such perforations adapted to focus light on the opposite wall of the font, such opposite wall being coated with color distinct from that of the ink.

FELIX RIESENBERG.

Witnesses:
 CLINTON H. BLAKE, Jr.,
 H. ALFRED JANKE.